(12) United States Patent  
Suzuki et al.

(10) Patent No.: US 9,445,373 B2  
(45) Date of Patent: Sep. 13, 2016

(54) WIRELESS COMMUNICATION SYSTEM, BASE STATION APPARATUS, MOBILE STATION APPARATUS, WIRELESS COMMUNICATION METHOD AND INTEGRATED CIRCUIT

(71) Applicant: Sharp Kabushiki Kaisha, Osaka-shi, Osaka (JP)

(72) Inventors: Shoichi Suzuki, Osaka (JP); Tatsushi Aiba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/851,597

(22) Filed: Sep. 11, 2015

(65) Prior Publication Data

US 2016/0007300 A1 Jan. 7, 2016

Related U.S. Application Data

(63) Continuation of application No. 14/118,504, filed as application No. PCT/JP2012/059152 on Apr. 4, 2012, now Pat. No. 9,179,416.

(30) Foreign Application Priority Data

May 19, 2011 (JP) ................................. 2011-112148

(51) Int. Cl.
*H04W 4/00* (2009.01)
*H04W 52/18* (2009.01)
(Continued)

(52) U.S. Cl.
CPC ........... *H04W 52/18* (2013.01); *H04W 52/221* (2013.01); *H04W 52/50* (2013.01); *H04W 72/0473* (2013.01); *H04W 74/004* (2013.01); *H04W 74/006* (2013.01);
(Continued)

(58) Field of Classification Search
None
See application file for complete search history.

(56) References Cited

U.S. PATENT DOCUMENTS

2009/0286566 A1\* 11/2009 Lindholm ............. H04W 52/10  
455/522  
2011/0235609 A1\* 9/2011 Ahn ...................... H04L 5/0007  
370/329

(Continued)

FOREIGN PATENT DOCUMENTS

JP 2011-035861 A 2/2011  
WO WO 2009/135848 A2 11/2009  
(Continued)

OTHER PUBLICATIONS

3GPP TS 36.213 V10.1.0 (Mar. 2011), 3rd Generation Partnership Project; Technical Specification Group Radio Access Network; Evolved Universal Terrestrial Radio Access (E-UTRA); Physical layer Procedures (Release 10), pp. 1, 2, 9-12, 20, and 21.

(Continued)

*Primary Examiner* — Afshawn Towfighi  
(74) *Attorney, Agent, or Firm* — Birch, Stewart, Kolasch & Birch, LLP

(57) ABSTRACT

A mobile station apparatus resets a first parameter or a second parameter, dependent on whether a random access response corresponds to a primary cell or a secondary cell, in a case that the random access response is received, wherein the random access response corresponding to a first serving cell is received in the first serving cell and the random access response corresponding to a second serving cell is received in the second serving cell.

4 Claims, 7 Drawing Sheets

(51) Int. Cl.
  H04W 52/50 (2009.01)
  H04W 74/08 (2009.01)
  H04W 52/22 (2009.01)
  H04W 72/04 (2009.01)
  H04W 74/00 (2009.01)
  H04W 52/14 (2009.01)
  H04W 28/18 (2009.01)
  H04W 88/02 (2009.01)
  H04W 88/08 (2009.01)
  H04W 52/32 (2009.01)

(52) U.S. Cl.
  CPC ........ *H04W 74/0833* (2013.01); *H04W 28/18* (2013.01); *H04W 52/146* (2013.01); *H04W 52/325* (2013.01); *H04W 88/02* (2013.01); *H04W 88/08* (2013.01); *Y02B 60/50* (2013.01)

(56) References Cited

U.S. PATENT DOCUMENTS

2012/0127931 A1* 5/2012 Gaal .................. H04L 1/1861
                                                       370/329

2012/0188961 A1   7/2012 Suzuki et al.

FOREIGN PATENT DOCUMENTS

WO    WO 2009/157390 A1   12/2009
WO    WO 2010/008859 A1    1/2010
WO    WO 2010/064968 A1    6/2010

OTHER PUBLICATIONS

Notice of Allowance issued in copending U.S. Appl. No. 14/118,504, dated May 11, 2015.

Renesas Mobile Europe, "Discussion on RACH Based Solution and Timing Difference Based Solution", 3GPP TSG-RAN WG2 Meeting #74, R2-113015, May 9-13, 2011, 4 pages, Barcelona, Spain.

Intel Corporation, Enhancements on MAC procedures to support CA with multiple TA(online) 3GPP TSG-RAN WG2#74, R2-113214, May 9-13, 2011, 2 pages.

ZTE, Remaining issues related to CA during random access procedure in LTE-A(online), 3GPP TSG-RAN WG1#64, RI-110826, Feb. 21-25, 2011, pp. 1-5.

* cited by examiner

WIRELESS COMMUNICATION SYSTEM, BASE STATION APPARATUS, MOBILE STATION APPARATUS, WIRELESS COMMUNICATION METHOD AND INTEGRATED CIRCUIT

This application is a Continuation of copending application Ser. No. 14/118,504, filed on Nov. 18, 2013, which was filed as PCT International Application No. PCT/JP2012/059152 on Apr. 4, 2012, which claims the benefit under 35 U.S.C. §119(a) to Patent Application No. 2011-112148, filed in Japan on May 19, 2011, all of which are hereby expressly incorporated by reference into the present application.

TECHNICAL FIELD

The present invention relates to a wireless communication system, a base station apparatus, a mobile station apparatus, a wireless communication method and an integrated circuit.

BACKGROUND ART

The evolution of radio access schemes and radio networks of cellular mobile communication (hereinafter, also referred to as "Long Term Evolution (LTE)" or "Evolved Universal Terrestrial Radio Access (EUTRA)") has been considered by the 3rd Generation Partnership Project (3GPP). In the LTE, an Orthogonal Frequency. Division Multiplexing (OFDM) scheme, which is multi-carrier transmission, is used as a communication scheme of wireless communication (downlink) from a base station apparatus to a mobile station apparatus. Further, a Single-Carrier Frequency Division Multiple Access (SC-FDMA) scheme, which is single carrier transmission, is used as a communication scheme of wireless communication (uplink) from the mobile station apparatus to the base station apparatus. In the LTE, the base station apparatus is referred to as an enhanced NodeB (eNodeB) and the mobile station apparatus is referred to as User Equipment (UE).

In the LTE Release-10, technology is used by which the mobile station apparatus and the base station apparatus communicate with each other by using a plurality of cells having the same channel structure as in the LTE Release-8/9 (also referred to as cell aggregation and carrier aggregation). For example, in communication using the cell aggregation, the mobile station apparatus and the base station apparatus can transceive a plurality of physical channels simultaneously by using the plurality of cells.

In the LTE Release-10, the base station apparatus transmits a Transmission Power Control command (TPC command) for a physical uplink channel by using a Physical Downlink Control Channel (PDCCH) to the mobile station apparatus. The mobile station apparatus calculates a parameter by accumulating a value indicated by the TPC command, and configures transmission power of the physical uplink channel by using the accumulated parameter.

In the LTE Release-11, it has been considered that, when performing communication using the cell aggregation, the mobile station apparatus transmits Physical Random Access Channels (PRACHs) to the base station apparatus in a plurality of cells (NPL 1). The base station apparatus determines a transmission timing of a physical uplink channel of each cell based on the PRACH received in a plurality of cells and transmits a random access response including information (TA command: Timing Advance command) used to control the amount of timing adjustment for the physical uplink channel of each cell, to the mobile station apparatus. The mobile station apparatus adjusts the transmission timing of the physical uplink channel of each cell based on the TA command included in the random access response transmitted by the base station apparatus.

CITATION LIST

Non Patent Literature

NPL 1: "Discussion on RACH based solution and Timing difference based solution", R2-113015, 3GPP TSG-RAN WG2 Meeting #74, Barcelona, Spain, 9th to 13th May, 2011.

SUMMARY OF INVENTION

Technical Problem

However, in the related art, there is a problem in that, when a mobile station apparatus transmits physical random access channels in a plurality of cells to a base station apparatus, a parameter calculated by accumulating a value indicated by a TPC command cannot be controlled efficiently.

The present invention has been made in consideration of the above circumstances, and an object of the present invention is to provide a wireless communication system, a base station apparatus, a mobile station apparatus, a wireless communication method and an integrated circuit in which when a mobile station apparatus transmits physical random access channels in a plurality of cells to a base station apparatus, transmission power of a physical uplink channel can be controlled efficiently.

Solution to Problem (1) In order to achieve the object, the present invention includes the following components. In other words, a mobile station apparatus of the present invention is a mobile station apparatus which performs a random access procedure with a base station apparatus in a plurality of cells, in which the mobile station apparatus receives downlink control information including a transmission power control command for a physical uplink control channel from the base station apparatus, calculates a parameter by accumulating a value indicated by the transmission power control command, sets transmission power of a physical uplink control channel by using the parameter, transmits the physical uplink control channel to the base station apparatus in a specific cell, and resets accumulated parameter, when a random access response for the specific cell is received from the base station apparatus.

(2) Further, in the mobile station apparatus of the present invention, an initial value of the parameter is a sum of a total value of power ramped up from a first transmitted preamble to a last transmitted preamble in the specific cell and a value indicated by the transmission power control command included in the random access response received in the specific cell.

(3) Further, in the mobile station apparatus of the present invention, the random access response is a response for a random access preamble transmitted by the mobile station apparatus, and includes a command used for an uplink timing adjustment of the specific cell to which the random access preamble is transmitted.

(4) Further, in the mobile station apparatus of the present invention, the random access response for the specific cell is transmitted in the specific cell.

(5) Further, a base station apparatus of the present invention is a base station apparatus which performs a random access procedure with a mobile station apparatus in a plurality of cells, in which the base station apparatus transmits downlink control information including a transmission power control command for a physical uplink control channel to the mobile station apparatus, receives the physical uplink channel from the mobile station apparatus in a specific cell, assumes that accumulated parameter is reset by the mobile station apparatus when a random access response is transmitted to the mobile station apparatus in the specific cell, and by the mobile station apparatus, the parameter is calculated by accumulating a value indicated by the transmission power control command, and used to set transmission power of the physical uplink channel.

(6) Further, in the base station apparatus of the present invention, an initial value of the parameter is a sum of a total value of power ramped up from a first transmitted preamble to a last transmitted preamble in the specific cell and a value indicated by the transmission power control command included in the random access response received in the specific cell.

(7) Further, in the base station apparatus of the present invention, the random access response is a response for a random access preamble transmitted by the mobile station apparatus, and includes a command used for an uplink timing adjustment of the specific cell to which the random access preamble is transmitted.

(8) Further, in the base station apparatus of the present invention, the random access response for the specific cell is transmitted in the specific cell.

(9) Further, a wireless communication method of the present invention is a wireless communication method used in a mobile station apparatus which performs a random access procedure with a base station apparatus in a plurality of cells, the method including receiving downlink control information including a transmission power control command for a physical uplink control channel from the base station apparatus, setting a parameter by accumulating a value indicated by the transmission power control command, configuring transmission power of a physical uplink control channel by using the parameter, transmitting the physical uplink control channel to the base station apparatus in a specific cell, and resetting accumulated parameter, when a random access response for the specific cell is received from the base station apparatus.

(10) Further, a wireless communication method of the present invention is a wireless communication method used in a base station apparatus which performs a random access procedure with a mobile station apparatus in a plurality of cells, the method including transmitting downlink control information including a transmission power control command for a physical uplink control channel to the mobile station apparatus, receiving the physical uplink channel from the mobile station apparatus in a specific cell, and assuming that accumulated parameter is reset by the mobile station apparatus when a random access response is transmitted to the mobile station apparatus in the specific cell, in which by the mobile station apparatus, the parameter is calculated by accumulating a value indicated by the transmission power control command, and used to set transmission power of the physical uplink channel.

(11) Further, an integrated circuit of the present invention is an integrated circuit used in a mobile station apparatus which performs a random access procedure with a base station apparatus in a plurality of cells, in which the integrated circuit receives downlink control information including a transmission power control command for a physical uplink control channel from the base station apparatus, calculates a parameter by accumulating a value indicated by the transmission power control command, sets transmission power of a physical uplink control channel by using the parameter, transmits the physical uplink control channel to the base station apparatus in a specific cell, and resets accumulated parameter, when a random access response for the specific cell is received from the base station apparatus.

(12) Further, an integrated circuit of the present invention is an integrated circuit used in a base station apparatus which performs a random access procedure with a mobile station apparatus in a plurality of cells, in which the integrated circuit transmits downlink control information including a transmission power control command for a physical uplink control channel to the mobile station apparatus, receives the physical uplink channel from the mobile station apparatus in a specific cell, assumes that accumulated parameter is reset by the mobile station apparatus when a random access response is transmitted to the mobile station apparatus in the specific cell, and in which by the mobile station apparatus, the parameter is calculated by accumulating a value indicated by the transmission power control command, and used to set transmission power of the physical uplink channel.

(13) Further, a mobile station apparatus of the present invention is a mobile station apparatus which performs a random access procedure with a base station apparatus in a plurality of cells, in which the mobile station apparatus receives downlink control information including a transmission power control command for a physical uplink channel of a cell from the base station apparatus, calculates a parameter of each cell by accumulating a value indicated by the transmission power control command, sets transmission power of a physical uplink channel of each cell by using the parameter of each cell, and resets accumulated parameter of a cell to which the random access response corresponds, when a random access response is received from the base station apparatus.

(14) Further, in the mobile station apparatus of the present invention, the physical uplink channel includes a physical uplink control channel.

(15) Further, in the mobile station apparatus of the present invention, the physical uplink channel includes a physical uplink shared channel.

(16) Further, a base station apparatus of the present invention is a base station apparatus which performs a random access procedure with a mobile station apparatus in a plurality of cells, in which the base station apparatus transmits downlink control information including a transmission power control command for a physical uplink channel of a cell to the mobile station apparatus, receives the physical uplink channel from the mobile station apparatus, assumes that accumulated parameter of the cell to which the random access response corresponds is reset by the mobile station apparatus when the random access response is transmitted to the mobile station apparatus, and in which by the mobile station apparatus, the parameter is calculated by accumulating a value indicated by the transmission power control command at each cell, and used to set transmission power of the physical uplink channel.

(17) Further, in the base station apparatus of the present invention, the physical uplink channel includes a physical uplink control channel.

(18) Further, in the base station apparatus of the present invention, the physical uplink channel includes a physical uplink shared channel.

(19) Further, a wireless communication method of the present invention is a wireless communication method used in a mobile station apparatus which performs a random access procedure with a base station apparatus in a plurality of cells, the method including receiving downlink control information including a transmission power control command for a physical uplink channel of a cell from the base station apparatus, calculating a parameter of each cell by accumulating a value indicated by the transmission power control command, setting transmission power of a physical uplink channel of each cell by using the parameter of each cell, and resetting accumulated parameter of a cell to which the random access response corresponds, when a random access response is received from the base station apparatus.

(20) Further, a wireless communication method of the present invention is a wireless communication method used in a base station apparatus which performs a random access procedure with a mobile station apparatus in a plurality of cells, the method including transmitting downlink control information including a transmission power control command for a physical uplink channel of a cell to the mobile station apparatus, receiving the physical uplink channel from the mobile station apparatus, and assuming that accumulated parameter of the cell to which the random access response corresponds is reset by the mobile station apparatus when the random access response is transmitted to the mobile station apparatus, in which by the mobile station apparatus, the parameter is calculated by accumulating a value indicated by the transmission power control command at each cell, and used to set transmission power of the physical uplink channel.

(21) Further, an integrated circuit of the present invention is an integrated circuit used in a mobile station apparatus which performs a random access procedure with a base station apparatus in a plurality of cells, in which the integrated circuit receives downlink control information including a transmission power control command for a physical uplink channel of a cell from the base station apparatus, calculates a parameter of each cell by accumulating a value indicated by the transmission power control command, sets transmission power of a physical uplink channel of each cell by using the parameter of each cell, and resets accumulated parameter of a cell to which the random access response corresponds, when a random access response is received from the base station apparatus.

(22) Further, an integrated circuit of the present invention is an integrated circuit used in a base station apparatus which performs a random access procedure with a mobile station apparatus in a plurality of cells, in which the integrated circuit transmits downlink control information including a transmission power control command for a physical uplink channel of a cell to the mobile station apparatus, receives the physical uplink channel from the mobile station apparatus, assumes that accumulated parameter of the cell to which the random access response corresponds is reset by the mobile station apparatus when the random access response is transmitted to the mobile station apparatus, and in which by the mobile station apparatus, the parameter is calculated by accumulating a value indicated by the transmission power control command at each cell, and used to set transmission power of the physical uplink channel.

Advantageous Effects of Invention

According to the present invention, in a case that a mobile station apparatus transmits a physical random access channel to a base station apparatus in a plurality of cells, it is possible to efficiently control transmission power of a physical uplink channel.

DESCRIPTION OF EMBODIMENTS

Hereinafter, embodiments of the present invention will be described with reference to drawings.

First, physical channels in the present invention will be described.

Figure 1:
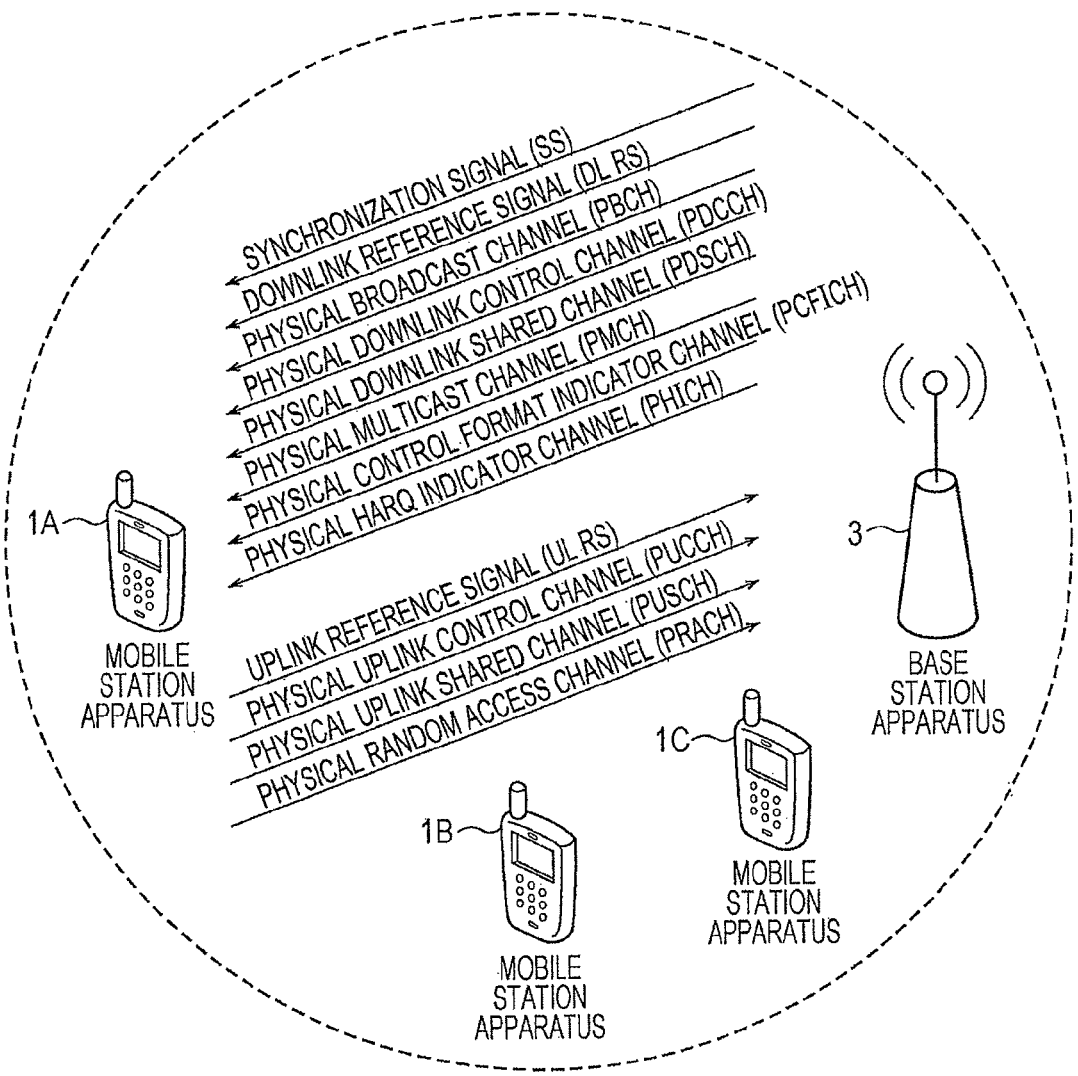
FIG. 1 is a conceptual diagram of a wireless communication system according to an embodiment of the present invention.

FIG. 1 is a conceptual diagram of a wireless communication system according to an embodiment of the present invention. In FIG. 1, the wireless communication system includes mobile station apparatuses 1A to 1C and a base station apparatus 3. FIG. 1 shows that a Synchronization Signal (SS), a Downlink Reference Signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) are used in wireless communication (downlink) from the base station apparatus 3 to the mobile station apparatuses 1A to 1C.

Further, FIG. 1 shows that an Uplink Reference Signal (UL RS), a Physical Uplink control channel (PUCCH), a Physical Uplink Shared Channel (PUSCH), and a Physical Random Access Channel (PRACH) are used in wireless communication (uplink) from the mobile station apparatuses 1A to 1C to the base station apparatus 3. Hereinafter, the mobile station apparatuses 1A to 1C are termed the mobile station apparatus 1.

The synchronization signal is a signal used in order for the mobile station apparatus 1 to synchronize the time domain and the frequency domain of the downlink. The downlink reference signal is a signal used in order for the mobile station apparatus 1 to synchronize the time domain and the frequency domain of the downlink, used in order for the mobile station apparatus 1 to measure a reception quality of the downlink, or used in order for the mobile station apparatus 1 to perform a propagation path correction of the PDSCH and the PDCCH. The PBCH is a physical channel used to broadcast the system information (Broadcast Channel: BCH). The system information transmitted on the PBCH is termed MasterInformationBlock (MIB).

The PDCCH is a physical channel used to transmit Downlink Control Information (DCI) such as a downlink assignment (referred to as a downlink assignment or a downlink grant) and an uplink grant. The downlink assignment includes information regarding a modulation scheme and a code rate for the PDSCH (Modulation and Coding Scheme: MCS), information indicating radio resource allocation, a Transmission Power Control command (TPC command) for the PUCCH, and the like. The uplink grant includes information regarding a modulation scheme and a code rate for the PUSCH, information indicating radio resource allocation, a TPC command for the PUSCH, and the like. The details of the uplink grant will be described later.

For the downlink control information, a plurality of formats are used. The format of the downlink control information is termed a DCI format. For example, a DCI format 0 is used for the scheduling of the PUSCH in a single cell in a single antenna port mode. A DCI format 4 is used for the scheduling of the PUSCH in a single cell in a multi-antenna port mode. A DCI format 3 is used for the transmission of a plurality of TPC commands for the PUSCH or a plurality of TPC commands for the PUCCH. The DCI format 0 and the DCI format 4 are the uplink grant.

The PDSCH is a physical channel used to transmit paging information (Paging Channel: PCH), system information and downlink data (Downlink Shared Channel: DL-SCH) different from the system information transmitted on the PBCH. The system information transmitted on the PDSCH is termed System Information Block (SIB). The PMCH is a physical channel used to transmit information (Multicast Channel: MCH) regarding Multimedia Broadcast and Multicast Service (MBMS). The PCFICH is a physical channel used to transmit information indicating a region in which the PDCCH is disposed. The PHICH is a physical channel used to transmit HARQ indicator (response information) indicating the success or failure of the decoding of uplink data received by the base station apparatus 3.

If the base station apparatus 3 succeeds in decoding of the uplink data included in the PUSCH, the HARQ indicator for the uplink data indicates an ACKnowledgement (ACK), whereas if the base station apparatus 3 fails to decode the uplink data included in the PUSCH, HARQ indicator for the uplink data indicates a Negative ACKnowledgement (NACK). A single PHICH transmits a HARQ indicator for a single piece of uplink data. HARQ indicators for a plurality of items of uplink data included in the same the PUSCH are transmitted using a plurality of PHICHs.

The uplink reference signal is a signal which is used in order for the base station apparatus 3 to synchronize the time domain of the uplink, used in order for the base station apparatus 3 to measure a reception quality of the uplink, or used in order for the base station apparatus 3 to perform a propagation path correction of the PUSCH and the PUCCH. The uplink reference signal includes a Demodulation Reference Signal (DMRS) which is time-multiplexed with the PUSCH or the PUCCH so as to be transmitted, and a Sounding Reference Signal (SRS) transmitted independent of the PUSCH and the PUCCH.

the PUCCH is a physical channel used to transmit Uplink Control Information (UCI), which is information used to control communication such as Channel State Information (CSI) indicating the channel quality of the downlink, a Scheduling Request (SR) indicating a request of a radio resource of the PUSCH, and an ACK/NACK indicating the success or failure of the decoding of downlink data received by the mobile station apparatus 1.

The PUSCH is a physical channel used to transmit uplink data and uplink control information. The PRACH is a physical channel used to transmit a random access preamble. The PRACH is mainly used in order for the mobile station apparatus 1 to synchronize the base station apparatus 3 in the time domain, in addition thereto, and used in an initial connection establishment procedure, a handover procedure, a connection re-establishment procedure, a synchronization for uplink transmission (timing adjustment), and a request of uplink radio resource allocation.

The uplink data (UL-SCH) and the downlink data (DL-SCH) are transport channels. The unit of uplink data which is transmitted on the PUSCH and the unit of downlink data which is transmitted on the PDSCH are termed a transport block (TB). The transport block is a unit treated in a Media Access Control (MAC) layer, and HARQ (retransmission) is controlled at each transport block. Further, the unit of data treated in the MAC layer, such as the uplink data (UL-SCH) and the downlink data (DLSCH), is termed a MAC Protocol Data Unit (PDU). In the physical layer, the transport block is mapped to code words and a coding process is performed at each code word.

Hereinafter, a cell aggregation (carrier aggregation) of the present invention will be described.

Figure 2:
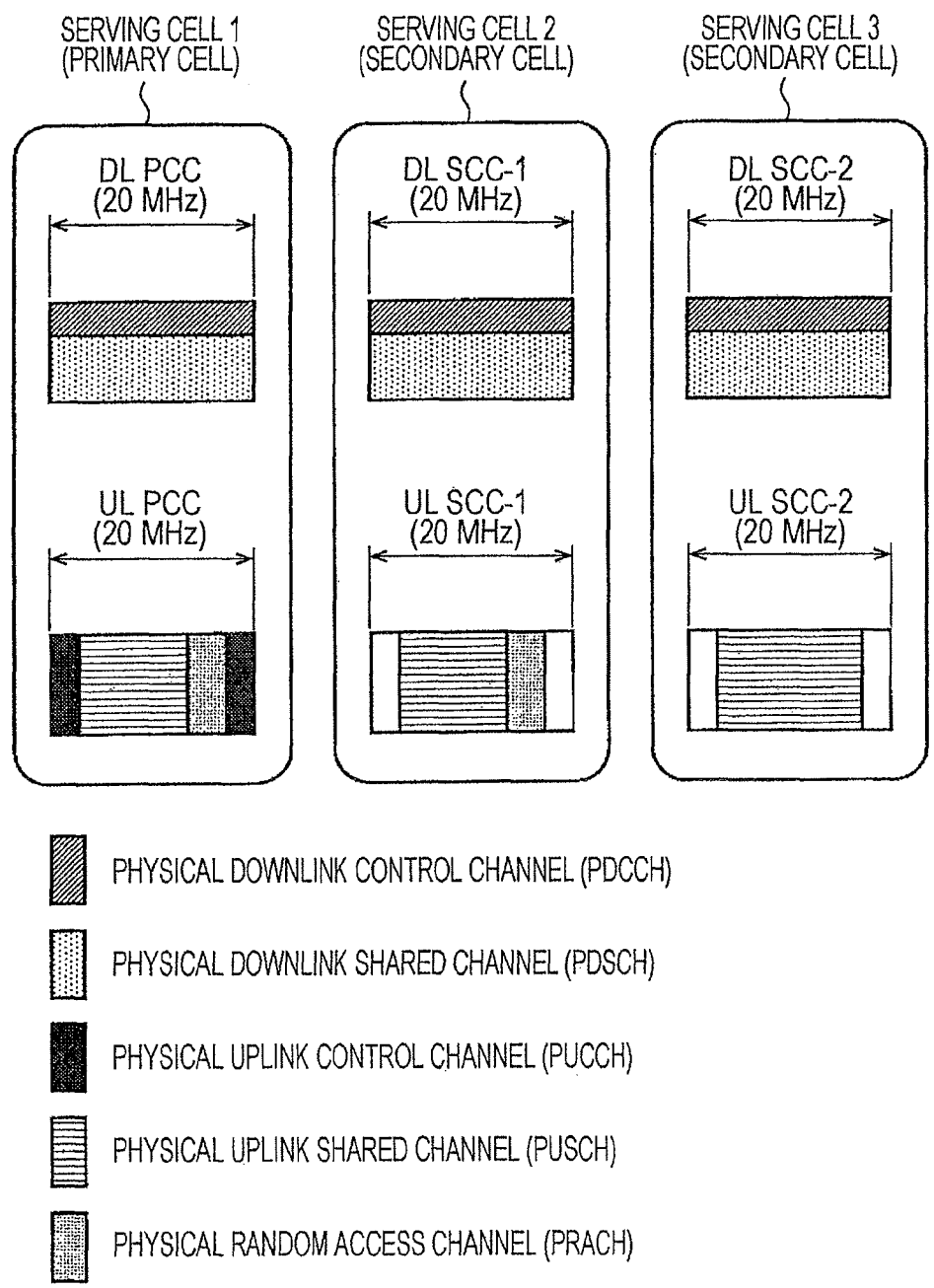
FIG. 2 is a diagram showing an example of cell aggregation of the present invention.

In the cell aggregation, a plurality of serving cells are aggregated. FIG. 2 is a diagram showing an example of cell aggregation of the present invention. In the cell aggregation processing shown in FIG. 2, three serving cells (a serving cell 1, a serving cell 2, and a serving cell 3) are aggregated. Among a plurality of serving cells to be aggregated, one serving cell is a Primary cell (Pcell).

The primary cell is the serving cell with the same function as in the cell of the LTE Release-8/9. The primary cell is the cell on which the mobile station apparatus 1 performs an initial connection establishment procedure, the cell for which the mobile station apparatus 1 initiates a connection re-establishment procedure, or the cell designated as the primary cell during a handover procedure.

The serving cells other than the primary cell are Secondary cells (Scells). The secondary cells are used to provide additional radio resources, and mainly used for the transmission and reception of the PDSCH, the PUSCH, and the PRACH. The secondary cells operate on the frequencies different from the primary cell, and are configured by the base station apparatus 3 after the connection between the mobile station apparatus 1 and the base station apparatus 3 is established. The mobile station apparatus 1 performs the transmission of the PUCCH only in the primary cell, but does not perform the transmission of the PUCCH in the secondary cells. The mobile station apparatus 1 may not receive paging and system information transmitted on the PBCH and the PDSCH of the secondary cells.

The carrier corresponding to the serving cell in the downlink is a Downlink Component Carrier (DL CC), and the carrier corresponding to the serving cell in the uplink is an Uplink Component Carrier (UL CC). The carrier corresponding to the primary cell in the downlink is a Downlink Primary Component Carrier (DL PCC), and the carrier corresponding to the primary cell in the uplink is an Uplink Primary Component Carrier (UL PCC). The carrier corresponding to the secondary cell in the downlink is a Downlink Secondary Component Carrier (DL SCC), and the carrier corresponding to the secondary cell in the uplink is an Uplink Secondary Component Carrier (UL SCC).

The physical channels transmitted in the serving cells have the same channel structure as in the LTE Release-8/9. Each of the physical channels is transmitted in any one of the serving cells. In other words, a single physical channel is not transmitted in a plurality of serving cells. A single PDSCH can be transmitted in a single serving cell (DL CC), and a single PUSCH can be transmitted in a single serving cell (UL CC).

The downlink assignment used for scheduling of the PDSCH of the primary cell and the uplink grant used for the scheduling of the PUSCH of the primary cell are transmitted on the PDCCH of the primary cell. The serving cell used for scheduling of the secondary cell is configured by the base station apparatus 3 at each secondary cell. In other words, the serving cell, to which the downlink assignment used for the scheduling of the PDSCH of the secondary cell and the uplink grant used for the scheduling of the PUSCH of the secondary cell are transmitted, is configured by the base station apparatus 3 at each secondary cell.

The base station apparatus 3 notifies the mobile station apparatus of whether or not information (Carrier Indicator) indicating the serving cell, to which the downlink assignment and the uplink grant correspond, is included in the downlink assignment and the uplink grant at each serving cell. The PHICH is transmitted in the serving cell to which the uplink grant used for the scheduling of the PUSCH corresponded by the PHICH is transmitted.

Hereinafter, a random access procedure of the present invention will be described.

The mobile station apparatus 1 receives information indicating a set of PRACH resources of the primary cell and information indicating a set of PRACH resources of at least one secondary cell from the base station apparatus 3, and configures the sets of PRACH resources. The mobile station apparatus 1 selects one PRACH resource from the set of PRACH resources that have been configured, and transmits a random access preamble to the base station apparatus 3 in the selected PRACH resource. Here, the mobile station apparatus 1 may transmit simultaneously (in the same subframe) a plurality of random access preambles by using one PRACH resource of each serving cell. For example, the mobile station apparatus 1 may transmit simultaneously a plurality of random access preambles by using the PRACH resource of the primary cell and the PRACH resource of the secondary cell. For example, the mobile station apparatus 1 can transmit a random access preamble indicated by information of six bits, as a result, 64 types of random access preambles are prepared (defined).

The base station apparatus 3 transmits downlink control information instructing the transmission of the PRACH in the primary cell or the secondary cell on the PDCCH. The mobile station apparatus 1 transmits the PRACH of the secondary cell only when instructed from the base station apparatus 3. The PRACH of the secondary cell is used to control the amount of timing adjustment for the physical uplink channel of the secondary cell. Further, the mobile station apparatus 1 may transmit the PRACH of the primary cell for the request of an uplink radio resource allocation. The mobile station apparatus 1 does not transmit the PRACH of the secondary cell for the request of an uplink radio resource allocation.

The base station apparatus 3 receives the random access preamble from the mobile station apparatus 1, and calculates the amount of timing adjustment for the physical uplink channel of the serving cell based on the received random access preamble. The base station apparatus 3, in response to the received random access preamble, transmits a random access response including information (TA command: Timing Advance command) indicating the amount of the timing adjustment for the physical uplink channel. In other words, the TA command is used for the uplink timing adjustment of the cell.

Here, the base station apparatus 3 transmits a random access response in the PDSCH of the primary cell in response to the random access preamble received in the primary cell. Further, the base station apparatus 3 transmits downlink control information (DCI format) used for the scheduling of the PDSCH of the primary cell, to which random access response is transmitted, in the PDCCH of the primary cell. Here, a Random Access-Radio Network Temporary Identifier (RARNTI) is used for the transmission of the downlink control information. For example, the base station apparatus 3 transmits a random access response including a Random Access Preamble identifier corresponding to the random access preamble received in the primary cell and a TA command to the mobile station apparatus 1.

In addition, the base station apparatus 3, in response to the random access preamble received in the secondary cell, transmits a random access response to the PDSCH of the primary cell or the PDSCH of the secondary cell. Further, the base station apparatus 3 transmits downlink control information (DCI format) used for the scheduling of the PDSCH of the primary cell, to which random access response is transmitted, on the PDCCH of the primary cell. Further, the base station apparatus 3 transmits downlink control information used for the scheduling of the PDSCH of the secondary cell to which the random access response is transmitted, on the PDCCH of the serving cell which is configured in the base station apparatus 3 so as to be used for the scheduling of the secondary cell to which the random access response is transmitted, or on the PDCCH of the secondary cell to which the random access response is transmitted.

Here, a Random Access-Radio Network Temporary Identifier (RA-RNTI) or a Cell-Radio Network Temporary Identifier (C-RNTI) is used for the transmission of the downlink control information. For example, the base station apparatus 3 transmits a random access response including a random access preamble identifier corresponding to the random access preamble received in the secondary cell and a TA command to the mobile station apparatus 1. Here, the base station apparatus 3 may transmit a random access response without including a random access preamble identifier corresponding to the random access preamble received in the secondary cell to the mobile station apparatus 1.

Hereinafter, in the present embodiment, the random access response corresponding to the random access preamble received in the primary cell is termed a random access response for the primary cell, and the random access response corresponding to the random access preamble received in the secondary cell is termed the random access response for the secondary cell.

In addition, if the mobile station apparatus 1 is notified of an index (number) of a random access preamble by the base station apparatus 3, after succeeding in the reception of a random access response, the mobile station apparatus 1 terminates the random access procedure. Further, if the mobile station apparatus 1 selects a random access preamble, after succeeding in the reception of a random access response, the mobile station apparatus 1 transmits a random access message 3 to the base station apparatus 3 and receives the random access message 4 from the base station apparatus 3.

Further, if the mobile station apparatus 1 does not receive a random access response for a random access preamble in a predetermined period (in a random access response window) after transmitting a random access preamble, the mobile station apparatus 1 retransmits the random access preamble. The retransmission of the random access preamble is performed in the same cell as a cell in which the transmission of the random access preamble is performed.

Here, the random access response for the primary cell includes a random access response grant. The random access response grant is used for the scheduling of the PUSCH, and includes a TPC command. In other words, the random access response for the primary cell includes the TPC command. Here, the random access response grant may be included in a random access response for the secondary cell, or may not be included in the random access response for the secondary cell. In other words, the TPC command may not be included in the random access response for the secondary cell.

Hereinafter, a transmission power control of the PRACH of the present invention will be described.

The mobile station apparatus 1 performs the setting of transmission power of the PRACH, the PUSCH and the PUCCH at each serving cell (hereinafter, a certain serving cell is termed a serving cell c as well). For example, the mobile station apparatus 1 performs the setting of the transmission power $P_{PRACH,c}$ for the PRACH of the serving cell c based on Expressions (1) and (2).

[Expression 1]

PREAMBLE_RECIEVED_TARGET_POWER =

*preambleInitialReceivedTargetPower*+ DELTA_PREAMBLE+

(PREAMBLE_TRANSMISSION_COUNTER-1) · *powerRampingStep*

[Expression 2]

$$P_{PRACH,c} = \min\left\{\begin{array}{l} P_{CMAX,c}(i), \\ \text{PREAMBLE\_RECIEVED\_TARGET\_POWER} + \\ PL_c \end{array}\right\}[\text{dBm}]$$

where preambleInitialReceivedTargetPower is a parameter which is designated (configured) to the serving cell c from a higher layer, and is notified from the base station apparatus 3 to the mobile station apparatus 1. Further, DELTA_PREAMBLE indicates a power offset to be determined according to the format of a random access preamble. Further, PREAMBLE_TRANSMISSION_COUNTER is the number of times of the re-transmission for the random access preamble of the serving cell c. Further, powerRampingStep indicates a step size with which the mobile station apparatus 1 ramps up power when re-transmitting a random access preamble, and the value of powerRampingStep for the serving cell c is notified from the base station apparatus 3 to the mobile station apparatus 1. In other words, the value of powerRampingStep is notified from the base station apparatus 3 to the mobile station apparatus 1 for each serving cell c. Further, in order to reduce overhead of a signal of a downlink, the value of powerRampingStep of the serving cell c may be common.

In addition, min{X,Y} is a function to select a minimum value out of X and Y. Further, $P_{CMAx,c}$ is a maximum transmission power value that is configured in the sub-frame i of the serving cell c to which the PRACH is transmitted. Further, $PL_c$ is a path loss for the serving cell c that is measured by the mobile station apparatus 1. Here, the path loss for the primary cell is measured from the downlink signal of the primary cell. Further, the path loss for the secondary cell is measured from the downlink signal of its own cell (secondary cell) or the downlink signal of the primary cell. The base station apparatus 3 may inform the mobile station apparatus 1 of the serving cell in which path loss for the secondary cell is measured.

Hereinafter, a transmission power control of the PUSCH of the present invention will be described.

The mobile station apparatus 1 performs the setting of transmission power $P_{PUSCH,c}(i)$ for the PUSCH of a certain sub-frame (hereinafter, a certain sub-frame is also referred to as sub-frame i) based on Expression (1) or (2). The mobile station apparatus 1 performs the setting of transmission $P_{PUSCH,c}(i)$ for the PUSCH of a sub-frame i in the serving cell c based on Expression (1), when transmitting the PUSCH without transmitting the PUCCH in the sub-frame i of the serving cell c (a case where the PUCCH and the PUSCH are not transmitted at the same time).

[Expression 3]

$$P_{PUSCH,c}(i) = \min\left\{\begin{array}{l} P_{CMAX,c}(i), \\ 10\log_{10}(M_{PUSCH,c}(i)) + P_{O\_PUSCH,c} + \\ \alpha_c \cdot PL_c + \Delta_{TF,c}(i) + f_c(i) \end{array}\right\}[\text{dBm}]$$

Further, the mobile station apparatus 1 performs the setting of transmission power $P_{PUSCH,c}(i)$ for the PUSCH of a sub-frame i in the serving cell c based on Expression (2), when transmitting the PUCCH and the PUSCH in the sub-frame i of the serving cell c at the same time.

[Expression 4]

$$P_{PUSCH,c}(i) = \min\left\{\begin{array}{l} 10\log_{10}(P'_{CMAX,c}(i) - P'_{PUCCH}(i)), \\ 10\log_{10}(M_{PUSCH,c}(i)) + P_{O\_PUSCH,c} + \\ \alpha_c \cdot PL_c + \Delta_{TF,c}(i) + f_c(i) \end{array}\right\}[\text{dBm}]$$

Here, $P_{CMAX,c}$ is the antilogarithm of a number of $P_{CMAX,c}$. Further, $P'_{PUCCH,c}$ is the antilogarithm of a number of the transmission power of the PUCCH to be transmitted in the sub-frame i of the serving cell c. Further, $M_{PUSCH,c}(i)$ is a bandwidth of a resource allocation of the PUSCH that is represented by the number of the physical resource blocks in the sub-frame i of the serving cell c. Further, $P_{O\_PUSCH,c}$ is configured from a sum of a cell-specific parameter $P_{O\_NOMINAL\_PUSCH,c}$ designated with respect to the serving cell c from the higher layer and a mobile station apparatus-specific parameter $P_{O\_UE\_PUSCH,c}$ designated with respect to the serving cell c from the higher layer. Here, $P_{O\_NOMINAL\_PUSCH,c}$ and $P_{O\_UE\_PUSCH,c}$ are notified from the base station apparatus 3 to the mobile station apparatus 1. Further, $\alpha_c$ is a parameter of, for example, three bits designated with respect to the serving cell c from the higher layer, and one out of {0, 0.4, 0.5, 0.6, 0.7, 0.8, 0.9, and 1} is notified from the base station apparatus 3 to the mobile station apparatus 1. Further, $\Delta_{TF,c}(i)$ is an offset (offset value) calculated from a resource capacity and a transport block size at the time of initial transmission for the PUSCH to be transmitted in the sub-frame i of the serving cell c.

In addition, $f_c(i)$ is the value calculated from the TPC command for the serving cell c. The TPC command is included in the downlink control information (DCI format) transmitted using the PDCCH or the random access response. In other words, the TPC command is transmitted with included in the PDCCH. For example, the base station apparatus 3 transmits the uplink grant (DCI format 0/4 used for the scheduling of the PUSCH) including the TPC command for the PUSCH (indicated by information of two bits) to the mobile station apparatus 1 using the PDCCH. Further, for example, the base station apparatus 3 transmits downlink control information (DCI format 3) configured from a plurality of TPC commands for the PUSCH to the mobile station apparatus 1 using the PDCCH.

The mobile station apparatus 1 configures a first mode (accumulation, accumulation mode) or a second mode (absolute, absolute mode) as a mode of calculating $f_c(i)$ in response to a signal of a higher layer received from the base station apparatus 3. Here, the mobile station apparatus 1 which configures the first mode (referred to as also the mobile station apparatus 1 of the first mode) accumulates the value indicated by the TPC command transmitted using the PDCCH in $f_c(i)$. Further, the mobile station apparatus 1 which configures the second mode (referred to also as the mobile station apparatus 1 of the second mode) regards the value indicated by the TPC command for the sub-frame i of the serving cell c as $f_c(i)$ (set as the value of $f_c(i)$).

Further, when $P_{0\_UE\_PUSCH,c}$ for the serving cell c is changed, the mobile station apparatus 1 (the mobile station apparatus 1 of the first mode or the mobile station apparatus 1 of the second mode) sets (resets) the initial value $f_c(i)$ of $f_c(i)$ of the serving cell c, in which $P_{0\_UE\_PUSCH,c}$ is changed, to 0. For example, the mobile station apparatus 1 changes $P_{0\_UE\_PUSCH,c}$ in response to the signal of the higher layer to be transmitted by the base station apparatus 3. Further, in cases other than the case (case of changing $P_{0\_UE\_PUSCH,c}$ for the serving cell c), the mobile station apparatus 1 sets (resets) the initial value $f_c(i)$ of $f_c(i)$ based on Expressions (5) and (6).

$$f(0) = \Delta P_{rampup} + \delta_{msg2} \quad \text{[Expression 5]}$$

$$\Delta P_{rampup} = (\text{PREAMBLE\_TRANSMISSION\_COUNTER}-1) \cdot \text{powerRampingStep} \quad \text{[Expression 6]}$$

Here, $\Delta P_{rampup}$ is a total value of power ramped up from a first transmitted preamble to a last transmitted preamble in the serving cell c. Further, $\delta_{msg2}$ is a value indicated by the TPC command included in the random access response for the serving cell c. Further, when the TPC command is not included in the random access response for the secondary cell, the mobile station apparatus 1 may configure $\delta_{msg2}$ to 0. Further, when the TPC command is not included in the random access response for the secondary cell, the mobile station apparatus 1 may configure (reset) $f_c(i)$ to 0.

Here, when changing $P_{0\_UE\_PUSCH,c}$ for the serving cell c, the mobile station apparatus 1 (mobile station apparatus 1 of the first mode) resets the accumulated $f_c(i)$. Further, when receiving the random access response, the mobile station apparatus 1 resets the accumulated $f_c(i)$ of the serving cell to which the received random access response corresponds. In other words, when receiving the random access response for a serving cell (primary cell and/or secondary cell), the mobile station apparatus 1 resets the accumulated $f_c(i)$ of the serving cell (primary cell and/or secondary cell) to which the received random access response corresponds. In other words, when receiving the random access response, the mobile station apparatus 1 does not reset the accumulated $f_c(i)$ of serving cells other than the serving cell to which the received random access response corresponds.

Thus, the mobile station apparatus 1 can appropriately control the transmission power of the PUSCH at each serving cell. Here, the serving cell to which the received random access response corresponds is the serving cell to which the random access preamble corresponding to the random access response is transmitted by the mobile station apparatus 1.

Hereinafter, the transmission power control of the PUCCH of the present invention will be described.

The mobile station apparatus 1 performs the setting of the transmission power $P_{PUCCH,c}(i)$ for the PUCCH of the sub-frame i of the primary cell based on Expression (7).

[Expression 7]

$$P_{PUCCH,c}(i) = \min\left\{ \begin{array}{l} P_{CMAX,c}(i), \\ P_{0\_PUCCH,c} + PL_c + h(n_{CQI}, n_{HARQ}, n_{SR}) + \\ \Delta_{F\_PUCCH}(F) + \Delta_{TxD}(F') + g(i) \end{array} \right\} \text{[dBm]}$$

Here, $P_{0\_PUCCH,c}$ is configured from a sum of a cell-specific parameter $P_{0\_NOMINAL\_PUCCH,c}$ designated with respect to the primary cell from the higher layer and a mobile station apparatus-specific parameter $P_{0\_UE\_PUCCH,c}$ designated with respect to the primary cell from the higher layer. Here, $P_{0\_NOMINAL\_PUCCH,c}$ and $P_{0\_UE\_PUCCH,c}$ are notified from the base station apparatus 3 to the mobile station apparatus 1.

Further, $h(n_{CQI}, n_{HARQ}, n_{SR})$ indicates a value dependent on the PUCCH format. Here, $n_{CQI}$ corresponds to the number of information bits for channel quality information (channel state information is possible), $n_{HARQ}$ is a value determined by the number of the received transport blocks, the number of the received the PDSCH, or the like, and $n_{SR}$ is a value to be configured to 1 or 0 based on whether or not the mobile station apparatus 1 transmits SR on the PUCCH. For example, when the PUCCH format is the PUCCH format 1, the mobile station apparatus 1 configures $h(n_{CQI}, n_{HARQ}, n_{SR})$ to 0. Further, for example, when the PUCCH format is the PUCCH format 2, the mobile station apparatus 1 determines $h(n_{CQI}, n_{HARQ}, n_{SR})$ based on $n_{CQI}$ or $n_{HARQ}$. Further, for example, when the PUCCH format is the PUCCH format 3, the mobile station apparatus 1 determines $h(n_{CQI}, n_{HARQ}, n_{SR})$ based on $n_{HARQ}$ and $n_{SR}$.

Further, $\Delta_{F\_PUCCH}(F)$ is a parameter designated from the higher layer, and notified from the base station apparatus 3 to the mobile station apparatus 1. Here, $\Delta_{F\_PUCCH}(F)$ corresponds to the PUCCH format F. Further, $\Delta_{F\_PUCCH}(F)$ corresponding to the PUCCH format 1a is 0, and is not notified from the base station apparatus 3 to the mobile station apparatus 1. Here, when the mobile station apparatus 1 is configured to transmit the PUCCH in two antenna ports, $\Delta_{TxD}(F')$ is designated from the higher layer. $\Delta_{TxD}(F')$ corresponds to the PUCCH format F'.

In addition, $g_c(i)$ is a value calculated from the TPC command for the serving cell c. As shown in the above, the TPC command is included in downlink control information (DCI format) transmitted using the PDCCH or a random access response. In other words, the TPC command is transmitted with being included in the PDCCH. For example, the base station apparatus 3 transmits the downlink assignment (DCI format used for the scheduling of the PDSCH) including the TPC command for the PUCCH (indicated by information of two bits) to the mobile station apparatus 1 by using the PDCCH. Further, for example, the base station apparatus 3 transmits downlink control information (DCI format 3) configured from a plurality of TPC commands for the PUCCH to the mobile station apparatus 1 using the PDCCH. The mobile station apparatus 1 accumulates the value indicated by the TPC command transmitted using the PDCCH in $g_c(\cdot)$.

When changing $P_{0\_UE\_PUCCH,c}$, the mobile station apparatus 1 sets (resets) the initial value $g_c(0)$ of $g_c(i)$ to 0. For example, the mobile station apparatus 1 changes $P_{0\_UE\_PUCCH,c}$ in response to the signal of the higher layer to be transmitted by the base station apparatus 3. Further, in cases other than the case (case of changing $P_{0\_UE\_PUCCH,c}$ for the serving cell c), the mobile station apparatus 1 sets (resets) the initial value $g_c(i)$ of $g_c(i)$ based on Expression (8).

$$g(0)=\Delta P_{rampup}+\delta_{msg2} \qquad \text{[Expression 8]}$$

Here, $\Delta P_{rampup}$ is a total value of power ramped up from a first transmitted preamble to a last transmitted preamble in the primary cell. Further, $\delta_{msg2}$ is a value indicated by the TPC command included in the random access response for the primary cell.

Here, when changing $P_{0\_UE\_PUCCH,c}$ for the primary cell, the mobile station apparatus 1 (mobile station apparatus 1 of the first mode or mobile station apparatus 1 of the second mode) resets the accumulated $g_c(i)$. In other words, when receiving the random access response for the primary cell from the base station apparatus 3 in the primary cell, the mobile station apparatus 1 resets the accumulated $g_c(i)$. In other words, when receiving the random access response for the secondary cell from the base station apparatus 3 in the primary cell or the secondary cell, the mobile station apparatus 1 does not reset the accumulated $g_c(i)$. Thus, the mobile station apparatus 1 may be able to avoid the accumulated $g_c(i)$ from being reset frequently, and to properly control the transmission power of the PUCCH.

Further, when the mobile station apparatus 1 transmits the PUCCH to the base station apparatus 3 in the secondary cell (when the PUCCH of the primary cell and the PUCCH of the secondary cell can be transmitted in the same sub-frame or different sub-frames), the mobile station apparatus 1 configures the transmission power for the PUCCH in each serving cell. In this case, when changing $P_{0\_UE\_PUSCH,c}$ for the serving cell c, the mobile station apparatus 1 (mobile station apparatus 1 in the first mode or mobile station apparatus 1 in the second mode) may reset the accumulated $g_c(i)$ of the serving cell c in which $P_{0\_UE\_PUCCH,c}$ is changed.

Further, when receiving the random access response, the mobile station apparatus 1 may reset the accumulated $g_c(i)$ of the serving cell to which the received random access response corresponds. In other words, when receiving the random access response for the serving cell (primary cell and/or secondary cell), the mobile station apparatus 1 may reset the accumulated $g_c(i)$ of the serving cell (primary cell and/or secondary cell) to which the received random access response corresponds. In other words, when receiving the random access response, the mobile station apparatus 1 may not reset the accumulated $g_c(i)$ of serving cells other than the serving cell to which the received random access response corresponds.

Hereinafter, the configuration of the apparatus according to the present invention will be described.

Figure 3:
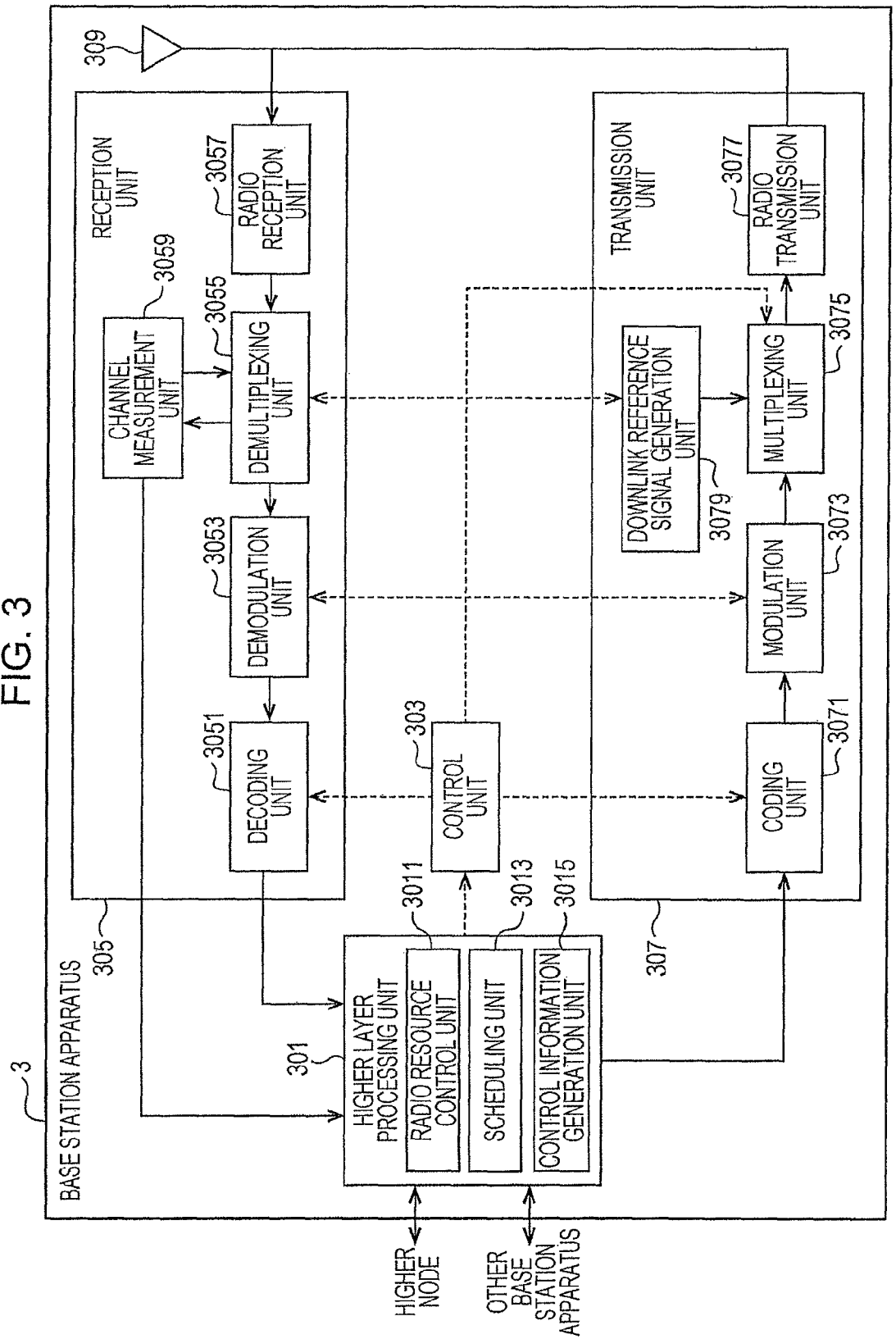
FIG. 3 is a schematic block diagram showing a configuration of a base station apparatus 3 of the present invention.

FIG. 3 is a schematic block diagram showing the configuration of the base station apparatus 3 of the present invention. As shown, the base station apparatus 3 is configured to include a higher layer processing unit 301, a control unit 303, a reception unit 305, a transmission unit 307, and a transceiving antenna 309. The higher layer processing unit 301 is configured to include a radio resource control unit 3011, a scheduling unit 3013 and a control information generation unit 3015. The reception unit 305 is configured to include a decoding unit 3051, a demodulation unit 3053, a de-multiplexing unit 3055, a radio reception unit 3057 and a channel measurement unit 3059. The transmission unit 307 is configured to include a coding unit 3071, a modulation unit 3073, a multiplexing unit 3075, a radio transmission unit 3077 and a downlink reference signal generation unit 3079.

The higher layer processing unit 301 performs the processing of a Medium Access Control (MAC) layer, a Packet Data Convergence Protocol (PDCP) layer, a Radio Link Control (RLC) layer, and a Radio Resource Control (RRC) layer. The higher layer processing unit 301 generates a control signal in order to perform a control of the reception unit 305 and the transmission unit 307, and outputs the control signal to the control unit 303.

The radio resource control unit 3011 included in the higher layer processing unit 301 generates or acquires from a higher node, downlink data (transport block), an RRC signal, and a MAC Control Element (CE), which are disposed in the PDSCH of the downlink so as to output to the transmission unit 307. Further, the radio resource control unit 3011 manages various items of configuration information of respective mobile station apparatus 1. For example, the radio resource control unit 3011 performs the management of modes of the TPC command and the management of the serving cell which is configured to the mobile station apparatus 1.

The scheduling unit 3013 included in the higher layer processing unit 301 performs scheduling of the PDSCH and the PUSCH and notifies the scheduling result to the control information generation unit 3015. The scheduling unit 3013 determines parameters regarding transmission power control of physical uplink channels (the PRACH, the PUSCH, and the PUCCH). The scheduling unit 3013 notifies the control information generation unit 3015 of the determined value of the TPC command.

Here, when the base station apparatus 3 transmits the random access response for the primary cell to the mobile station apparatus 1 (the mobile station apparatus 1 of the first mode or the mobile station apparatus 1 of the second mode) in the primary cell, the scheduling unit 3013 assumes (determines) that the mobile station apparatus 1 (the mobile station apparatus 1 of the first mode or the mobile station apparatus 1 of the second mode) resets the accumulated MD. Further, when the base station apparatus 3 transmits the random access response to the mobile station apparatus 1 of the first mode in the serving cell (the primary cell or the secondary cell), the scheduling unit 3013 assumes that the mobile station apparatus 1 of the first mode resets the accumulated $f_c(i)$ of the serving cell (the primary cell or the secondary cell) corresponding to the random access response.

The control information generation unit 3015 included in the higher layer processing unit 301 generates the downlink control information (the downlink assignment and the uplink grant) transmitted on the PDCCH based on the scheduling result notified from the scheduling unit 3013. The control information generation unit 3015 generates the TPC command based on the values of the TPC command notified from the scheduling unit 3013.

The control unit 303 generates a control signal to perform a control of the reception unit 305 and the transmission unit 307, based on the control information from the higher layer processing unit 301. The control unit 303 outputs the generated control signal to the reception unit 305 and the transmission unit 307 so as to perform a control of the reception unit 305 and the transmission unit 307.

The reception unit 305, in response to the control signal which is input from the control unit 303, separates, demodulates, and decodes the PUCCH, the PUSCH, the PRACH, and the uplink reference signal which are received from the mobile station apparatus 1 through the transceiving antenna 309, and outputs the decoded information to the higher layer processing unit 301. The reception unit 305 measures the state of the uplink channel from the received uplink signal, and outputs the measured result to the higher layer processing unit 301.

The transmission unit 307, in response to the control signal which is input from the control unit 303, generates a downlink reference signal, codes and modulates the HARQ indicator, the downlink control information, and the downlink data which are input from the higher layer processing unit 301, multiplexes the PHICH, the PDCCH, the PDSCH, and the downlink reference signal, and transmits the multiplexed signals to the mobile station apparatus 1 through the transceiving antenna 309.

Figure 4:
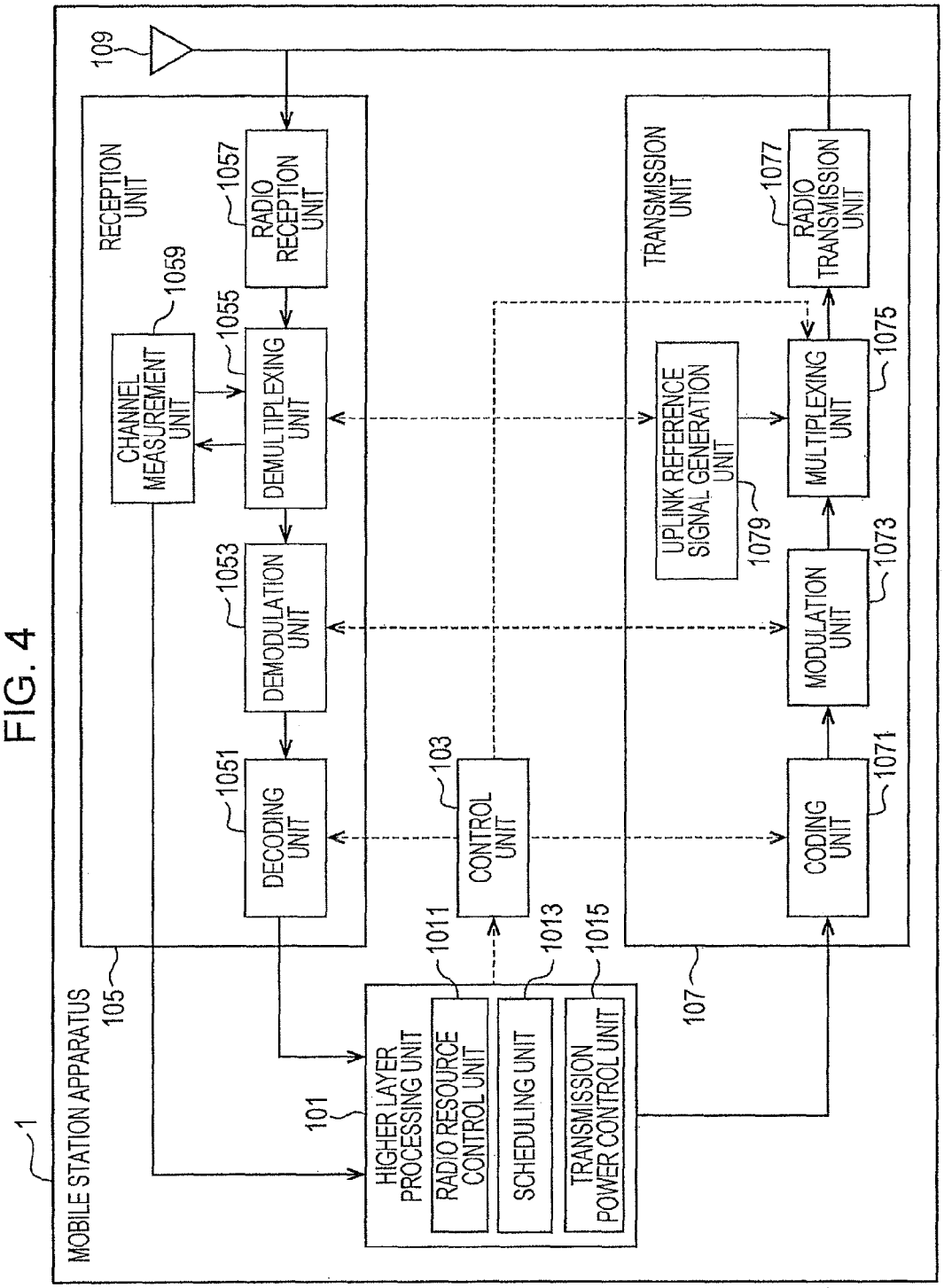
FIG. 4 is a schematic block diagram showing a configuration of a mobile station apparatus 1 of the present invention.

FIG. 4 is a schematic block diagram showing a configuration of a mobile station apparatus 1 of the present invention. As shown, the mobile station apparatus 1 is configured to include a higher layer processing unit 101, a control unit 103, a reception unit 105, a transmission unit 107 and a transceiving antenna 109. The higher layer processing unit 101 is configured to include a radio resource control unit 1011, a scheduling unit 1013, and a transmission power control unit 1015. The reception unit 105 is configured to include a decoding unit 1051, a demodulation unit 1053, a de-multiplexing unit 1055, a radio reception unit 1057 and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data generated by a user's operation to the transmission unit 107. Further, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Further, the higher layer processing unit 101 generates control information for controlling the reception unit 105 and the transmission unit 107, and outputs the control signal to the control unit 103.

The radio resource control unit 1011 included in the higher layer processing unit 101 performs a management of various configuration information of its own apparatus. For example, the radio resource control unit 1011 performs a management of the mode of the TPC command and a management of the serving cell. The radio resource control unit 1011 generates information disposed in each channel of the uplink, and outputs the information to the transmission unit 107.

The scheduling unit 1013 included in the higher layer processing unit 101 controls the reception unit 105 to receive the PDSCH according to the downlink assignment which is input from the reception unit 105, through the control unit 103. The scheduling unit 1013 controls the transmission unit 107 to transmit the PUSCH according to the uplink grant or the random access response grant which is input from the reception unit 105, through the control unit 103. The scheduling unit 1013 outputs the TPC command included in the downlink assignment, the uplink grant, or the random access response grant, to the transmission power control unit 1015.

The transmission power control unit 1015 included in the higher layer processing unit 101 performs the setting of the transmission power of the physical uplink channel, based on the value indicated by the TPC command which is input from the scheduling unit 1013 and the parameters regarding the transmission power control of the physical uplink channel which are input from the reception unit 105. The transmission power control unit 1015 accumulates the value of the TPC command for the PUSCH which is input from the scheduling unit 1013 in $f_c(\cdot)$, when the first mode (accumulation, accumulation mode) is configured. Further, the transmission power control unit 1015 regards the value of the TPC command for the PUSCH which is input from the scheduling unit 1013 as $f_c(\cdot)$, when the second mode (absolute, absolute mode) is configured.

When the mobile station apparatus 1 of the first mode receives the random access response in the serving cell (the primary cell or the secondary cell), the transmission power control unit 1015 resets the accumulated $f_c(\cdot)$ of the serving cell (the primary cell or the secondary cell) to which the received random access response corresponds. In other words, when the mobile station apparatus 1 receives the random access response, the transmission power control unit 1015 does not reset the accumulated $f_c(\cdot)$ of cells other than the serving cell to which the received random access response corresponds. Further, the mobile station apparatus 1 does not receive the random access response, and the transmission power control unit 1015 does not reset the accumulated $f_c(\cdot)$ of all serving cells.

Further, the transmission power control unit 1015 accumulates the values of the TPC command for the PUCCH which is input from the scheduling unit 1013 in $g_c(\cdot)$. Here, when the mobile station apparatus 1 (mobile station apparatus 1 of a first mode or mobile station apparatus 1 of a second mode) receives a random access response for the primary cell in the primary cell, the transmission power control unit 1015 resets the accumulated $g_c(\cdot)$. In other words, when the mobile station apparatus 1 (mobile station apparatus 1 of the first mode or the mobile station apparatus 1 of the second mode) receives the random access response for the secondary cell in the primary cell or the secondary cell, the transmission power control unit 1015 does not reset the accumulated $g_c(\cdot)$. When the mobile station apparatus 1 (the mobile station apparatus 1 of the first mode or the mobile station apparatus 1 of the second mode) does not receive the random access response for a certain serving cell (the primary cell or the secondary cell), the transmission power control unit 1015 does not reset the accumulated $g_c(\cdot)$.

The control unit 103 generates a control signal for performing a control of the reception unit 105 and the transmission unit 107 based on control information from the higher layer processing unit 101. The control unit 103 outputs the generated control signal to the reception unit 105 and the transmission unit 107 and performs the control of the reception unit 105 and the transmission unit 107.

The reception unit 105, in response to the control signal which is input from the control unit 103, separates, demodulates and decodes the PHICH, the PDCCH, the PDSCH and the downlink reference signal which are received from the base station apparatus 3 through the transceiving antenna 109, and outputs the decoded information to the higher layer processing unit 101. The reception unit 105 measures the states of the channels of the uplink based on the received downlink signals, and outputs the measured result to the higher layer processing unit 101.

The transmission unit 107, in response to a control signal which is input from the control unit 103, generates an uplink reference signal, codes and modulates the uplink data (transport block) which is input from the higher layer processing unit 101, and multiplexes the PRACH, the PUCCH, the PUSCH, and the generated uplink reference signal so as to transmit to the base station apparatus 3 through the transceiving antenna 109.

Hereinafter, the operation of the apparatus of the present invention will be described.

Figure 5:
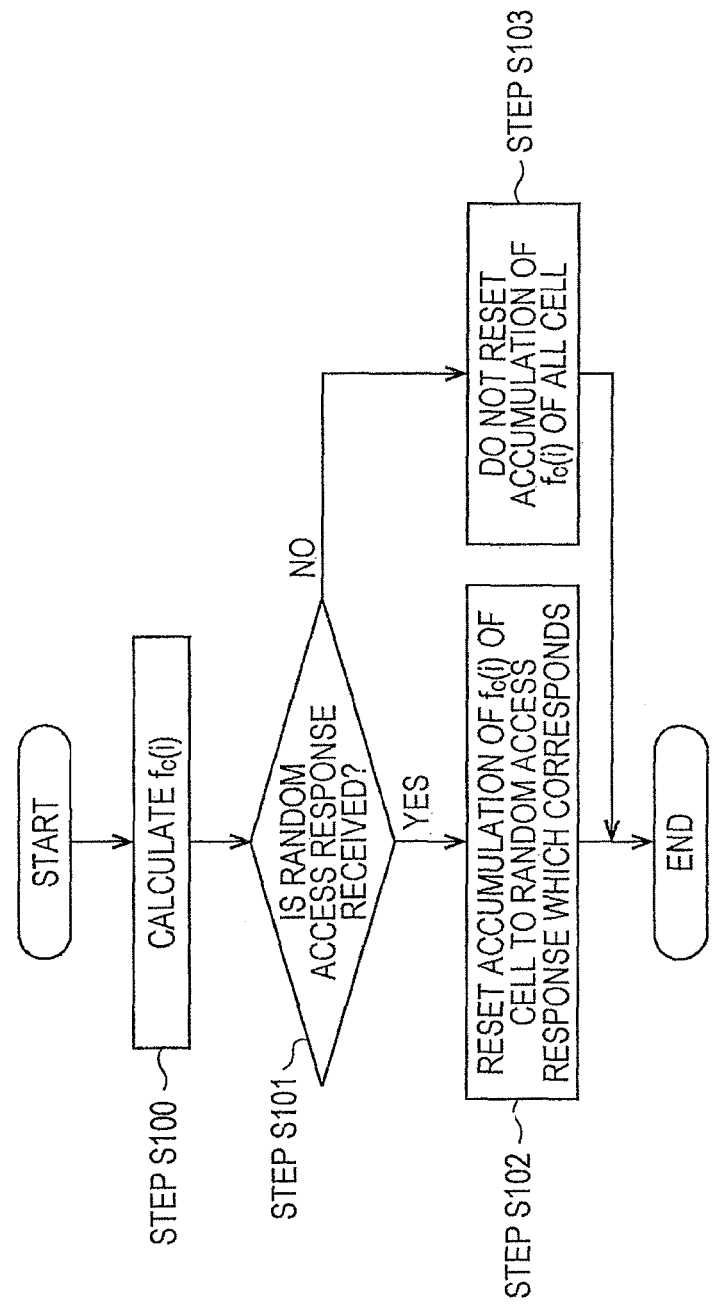
FIG. 5 is a flowchart showing an example of a process regarding a control of $f_c(i)$ by a mobile station apparatus 1 of the present invention.

FIG. 5 is a flowchart showing an example of a process regarding a control of $f_c(i)$ by the mobile station apparatus 1 of the present invention. The mobile station apparatus 1 accumulates the value indicated by the TPC command received in the PDCCH so as to calculate the value of $f_c(i)$ of each serving cell (step S100). When the random access response from the base station apparatus 3 is received (step S101-YES), the mobile station apparatus 1 resets the accumulated $f_c(i)$ of the serving cell to which the received random access response corresponds (step S102). At this time, the mobile station apparatus 1 does not reset the accumulated $f_c(i)$ of serving cells other than the serving cell to which the received random access response corresponds. When the random access response is not received (step S101-NO), the mobile station apparatus 1 does not reset the accumulated $f_c(i)$ of all serving cells (step S103). After step S102 or step S103, the mobile station apparatus 1 completes the process regarding the control of $f_c(i)$.

Figure 6:
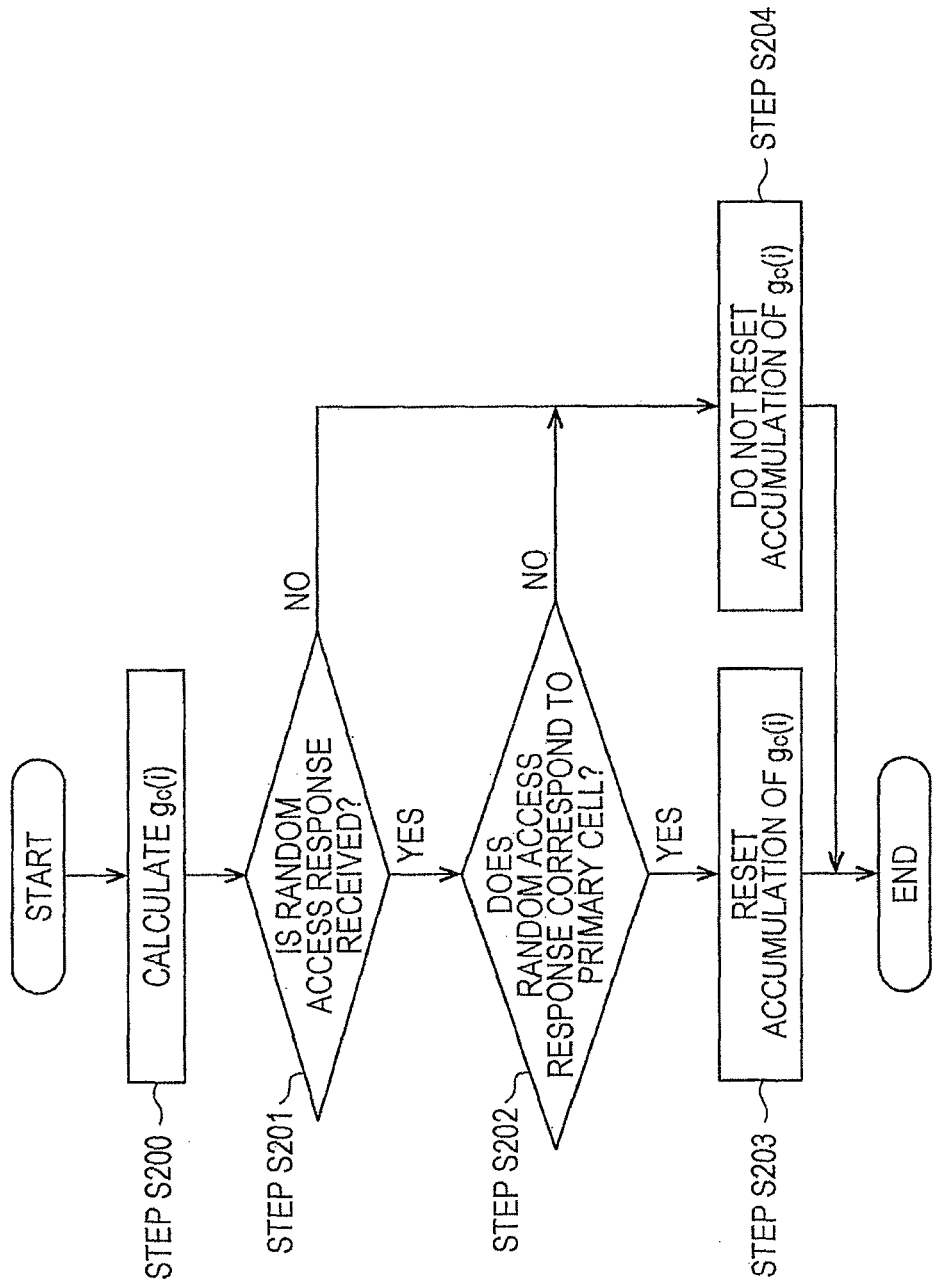
FIG. 6 is a flowchart showing an example of a process regarding a control of $g_c(i)$ by the mobile station apparatus 1 of the present invention.

FIG. 6 is a flowchart showing an example of a process regarding the control of $g_c(i)$ by the mobile station apparatus 1 of the present invention. The mobile station apparatus 1 accumulates the value indicated by the TPC command received in the PDCCH so as to calculate the value of $g_c(i)$ of the primary cell (step S200). When the random access response from the base station apparatus 3 is received (step S201-YES), if the received random access response corresponds to the primary cell (step S202-YES), the mobile station apparatus 1 resets the accumulated $g_c(i)$ (step S203). When the random access response from the base station apparatus 3 is not received (step S201-NO), the mobile station apparatus 1 does not reset the accumulated $g_c(i)$ (step S204). Further, when the random access response from the base station apparatus 3 is received (step S201-YES), if the received random access response does not correspond to the primary cell (step S202-NO), the mobile station apparatus 1 does not reset the accumulated $g_c(i)$. After step S203 or step S204, the mobile station apparatus 1 completes the process regarding the control of $g_c(i)$.

Figure 7:
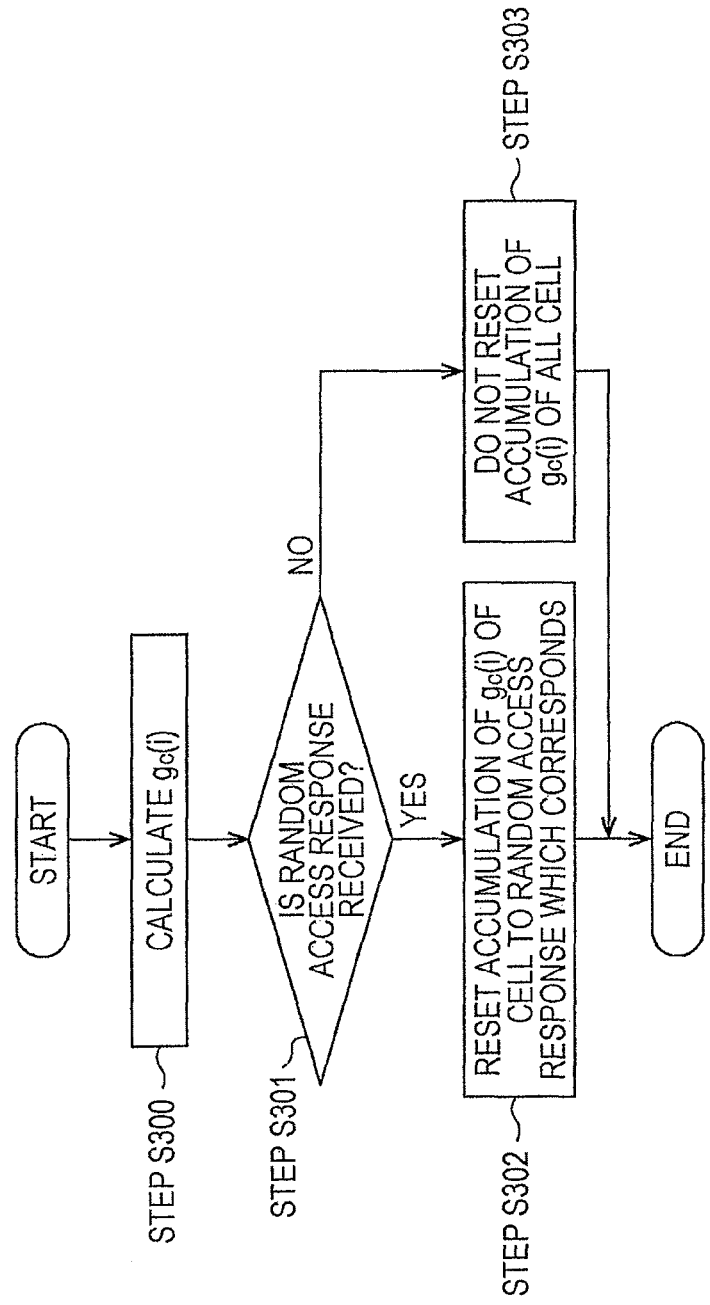
FIG. 7 is a flowchart showing another example of a process regarding a control of $g_c(i)$ by the mobile station apparatus 1 of the present invention.

FIG. 7 is a flowchart showing another example of a process regarding the control of $g_c(i)$ by the mobile station apparatus 1 of the present invention. FIG. 7 is a flowchart showing an example of a process regarding the control of $g_c(i)$ by the mobile station apparatus 1 when the mobile station apparatus 1 transmits the PUCCH in the secondary cell (when the PUCCH of the primary cell and the PUCCH of the secondary cell can be transmitted in the same sub-frame or different sub-frames).

The mobile station apparatus 1 accumulates the values indicated by the TPC command received in the PDCCH so as to calculate the values of $g_c(i)$ of each serving cell (step S300). When the random access response from the base station apparatus 3 is received (step S301-YES), the mobile station apparatus 1 resets the accumulated $g_c(i)$ of the serving cell to which the received random access response corresponds (step S302). At this time, the mobile station apparatus 1 does not reset the accumulated $g_c(i)$ of serving cells other than the serving cell to which the received random access response corresponds. When the random access response is not received (step S301-NO), the mobile station apparatus 1 does not reset the accumulated $g_c(i)$ of all serving cells (step S303). After step S302 or step S303, the mobile station apparatus 1 completes the process regarding the control of $g_c(i)$.

In this manner, according to the present invention, when the base station apparatus 3 and the mobile station apparatus 1 perform the random access procedure in a plurality of cells, the mobile station apparatus 1 receives downlink control information including Transmission Power Control command (TPC command) for the physical uplink control channel (PUCCH) from the base station apparatus 3, calculates parameter $g_c(i)$ by accumulating the values indicated by the TPC command, sets transmission power of the PUCCH by using the parameter $g_c(i)$, and transmits the PUCCH in the primary cell (specific cell) to the base station apparatus 3, and when receiving the random access response for the primary cell from the base station apparatus 3, the mobile station apparatus 1 resets the accumulated parameter $g_c(i)$.

Further, the mobile station apparatus 1 receives downlink control information including the TPC command for the physical uplink channel (the PUSCH or the PUCCH) of the cell from the base station apparatus 3, calculates the parameter ($f_c(i)$ or $g_c(i)$) of each cell by accumulating the value indicated by the TPC command, and sets transmission power of the physical uplink channel of each cell by using the parameter of each cell, and when receiving the random access response from the base station apparatus 3, the mobile station apparatus 1 resets the accumulated parameter of the cell to which the random access response corresponds.

Thus, the mobile station apparatus 1 can avoid frequently resetting the accumulated $f_c(i)$ and $g_c(i)$, and can suitably control the transmission power of the PUSCH and the PUCCH.

The program operated in the base station apparatus 3 and the mobile station apparatus 1 according to the present invention may be a program to control a Central Processing Unit (CPU) or the like (program to function a computer) so as to realize the function of the present embodiment according to the present invention. Then, information treated in these apparatuses is temporarily accumulated in a Random Access Memory (RAM) at the time of this process, thereafter, stored in various ROMs such as a Flash Read Only Memory (ROM) and a Hard Disk Drive (HDD), and is read by the CPU as necessary so as to perform rewriting.

Further, a portion of the mobile station apparatus 1 and the base station apparatus 3 in the embodiment described above may be realized in the computer. In this case, a program to realize the control function may be realized in such a manner that the program is recorded in a computer readable recording medium and the program recorded in the recording medium is read and performed in a computer system.

Further, the "computer system" as used herein is a computer system built in the mobile station apparatus 1 or the base station apparatus 3, and is intended to include OS and hardware such as peripheral devices. Further, the "computer readable recording medium" refers to a portable medium such as a flexible disk, a magneto-optical disk, a ROM, and a CD-ROM, and a storage device such as a hard disk built in the computer system.

Furthermore, the "computer readable recording medium" may include what holds the program dynamically in a short time such as communication lines when the program is transmitted through a network such as the Internet or a communication line such as a telephone line, or those holding the program in a fixed time such as a volatile memory inside the computer system serving as a server or client in that case. In addition, the program may be any one of those for realizing a portion of functions described above, and those that can be implemented by combining the function described above with a program already recorded in the computer system.

In addition, a portion or all of the mobile station apparatus 1 and some base station apparatus 3 in the embodiment described above may be typically implemented as an LSI which is an integrated circuit, or may be implemented as a chipset. The functional blocks of the mobile station apparatus 1 and the base station apparatus 3 may be manufactured into chips individually, or may be manufactured into chips by integrating a portion or all thereof. Further, technology to manufacture the integrated circuit is not limited to LSI, but may be implemented by a dedicated circuit or a general purpose processor. Further, when an integrated circuit manufacturing technology replacing LSI is encountered as a result of the advancement of semiconductor technology, the use of an integrated circuit according to the technology is also possible.

Although an embodiment of the invention has been described in detail with reference to the drawings, a specific structure is not limited to those described above, and various design changes are possible in a scope without departing from the spirit of the present invention.

REFERENCE SIGNS LIST 1 (1A,1B,1C) Mobile station apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling unit
1015 Transmission power control unit
3011 Radio resource control unit
3013 Scheduling unit
3015 Control information generation unit

The invention claimed is:

1. A mobile station apparatus comprising:
transmission circuitry configured to and/or programmed to:
   transmit a random access preamble on a first physical random access channel in a first serving cell or on a second physical random access channel in a second serving cell;
   transmit first control information on a first physical uplink control channel in the first serving cell; and
   transmit second control information on a second physical uplink control channel in the second serving cell;
reception circuitry configured to and/or programmed to:
   receive first physical downlink control channels, each of the first physical downlink control channels including a first downlink control information format including a first transmission power control command for the first physical uplink control channel;
   receive second physical downlink control channels, each of the second physical downlink control channels including a second downlink control information format including a second transmission power control command for the second physical uplink control channel; and
   receive a random access response on a physical downlink shared channel, the random access response corresponding to the random access preamble; and
transmission power control circuitry configured to and/or programmed to:
   set a first transmission power for transmission of the first physical uplink control channel in a sub-frame by using a first parameter being calculated by accumulating a plurality of first values indicated by the first transmission power control commands; and
   set a second transmission power for transmission of the second physical uplink control channel in a sub-frame by using a second parameter being calculated by accumulating a plurality of second values indicated by the second transmission power control commands, wherein
the transmission power control circuitry further configured to and/or programmed to reset the first parameter or the second parameter, dependent on whether the random access response corresponds to the primary cell or the secondary cell, in a case that the random access response is received,
the random access response corresponding to the first serving cell is received in the first serving cell, and
the random access response corresponding to the second serving cell is received in the second serving cell.

2. A communication method used for a terminal device, the communication method comprising:
transmitting a random access preamble on a first physical random access channel in a first serving cell or on a second physical random access channel in a second serving cell;
transmitting first control information on a first physical uplink control channel in the first serving cell;
transmitting second control information on a second physical uplink control channel in the second serving cell;
receiving first physical downlink control channels, each of the first physical downlink control channels including a first downlink control information format including a first transmission power control command for the first physical uplink control channel;
receiving second physical downlink control channels, each of the second physical downlink control channels including a second downlink control information format including a second transmission power control command for the second physical uplink control channel;
receiving a random access response on a physical downlink shared channel, the random access response corresponding to the random access preamble;
setting a first transmission power for transmission of the first physical uplink control channel in a sub-frame by using a first parameter being calculated by accumulating a plurality of first values indicated by the first transmission power control commands; and
setting a second transmission power for transmission of the second physical uplink control channel in a sub-frame by using a second parameter being calculated by accumulating a plurality of second values indicated by the second transmission power control commands, resetting the first parameter or the second parameter, dependent on whether the random access response corresponds to the primary cell or the secondary cell, in a case that the random access response is received, wherein the random access response corresponding to the first serving cell is received in the first serving cell, and the random access response corresponding to the second serving cell is received in the second serving cell.

3. A base station device which is configured to and/or programmed to communicate with a terminal device, the base station device comprising:

reception circuitry configured to and/or programmed to:
- receive a random access preamble on a first physical random access channel in a first serving cell or on a second physical random access channel in a second serving cell;
- receive first control information on a first physical uplink control channel in the first serving cell; and
- receive second control information on a second physical uplink control channel in the second serving cell;

transmission circuitry configured to and/or programmed to:
- transmit first physical downlink control channels, each of the first physical downlink control channels including a first downlink control information format including a first transmission power control command for the first physical uplink control channel;
- transmit second physical downlink control channels, each of the second physical downlink control channels including a second downlink control information format including a second transmission power control command for the second physical uplink control channel; and
- transmit a random access response on a physical downlink shared channel, the random access response corresponding to the random access preamble; and scheduling circuitry configured to and/or programmed to determine first values of the first transmission power control commands for the first physical uplink control channel and second values of the second transmission power control commands for the second physical uplink control channel by regarding that the terminal device is configured to and/or programmed to:
- set a first transmission power for transmission of the first physical uplink control channel in a sub-frame by using a first parameter being calculated by accumulating a plurality of first values indicated by the first transmission power control commands;
- set a second transmission power for transmission of the second physical uplink control channel in a sub-frame by using a second parameter being calculated by accumulating a plurality of second values indicated by the second transmission power control commands; and
- reset the first parameter or the second parameter, dependent on whether the random access response corresponds to the primary cell or the secondary cell, in a case that the random access response is received, wherein the random access response corresponding to the first serving cell is transmitted in the first serving cell, and the random access response corresponding to the second serving cell is transmitted in the second serving cell.

4. A communication method used for a base station device which is configured to and/or programmed to communicate with a terminal device, the communication method comprising:

receiving a random access preamble on a first physical random access channel in a first serving cell or on a second physical random access channel in a second serving cell;

receiving first control information on a first physical uplink control channel in the first serving cell;

receiving second control information on a second physical uplink control channel in the second serving cell;

transmitting first physical downlink control channels, each of the first physical downlink control channels including a first downlink control information format including a first transmission power control command for the first physical uplink control channel;

transmitting second physical downlink control channels, each of the second physical downlink control channels including a second downlink control information format including a second transmission power control command for the second physical uplink control channel;

transmitting a random access response on a physical downlink shared channel, the random access response corresponding to the random access preamble;

determining first values of the first transmission power control commands for the first physical uplink control channel and second values of the second transmission power control commands for the second physical uplink control channel;

setting a first transmission power for transmission of the first physical uplink control channel in a sub-frame by using a first parameter being calculated by accumulating a plurality of first values indicated by the first transmission power control commands;

setting a second transmission power for transmission of the second physical uplink control channel in a sub-frame by using a second parameter being calculated by accumulating a plurality of second values indicated by the second transmission power control commands; and resetting the first parameter or the second parameter, dependent on whether the random access response corresponds to the primary cell or the secondary cell, in a case that the random access response is received, wherein the random access response corresponding to the first serving cell is transmitted in the first serving cell, and the random access response corresponding to the second serving cell is transmitted in the second serving cell.

* * * * *